Nov. 15, 1955

F. A. BLAKE ET AL 2,723,653

INTERNAL COMBUSTION ENGINE OF
HIGH COMPRESSION TYPE

Filed Oct. 24, 1952

INVENTORS
FLOYD A. BLAKE
LIONEL D. THOMPSON
BY
Paul L. Kuhn
ATTY.

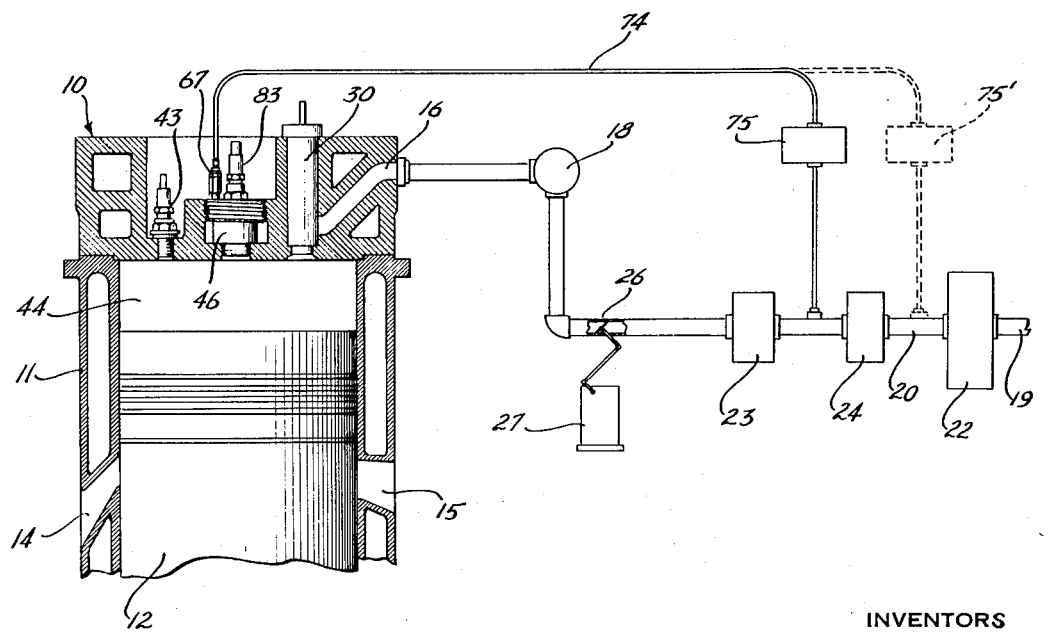

Nov. 15, 1955  F. A. BLAKE ET AL  2,723,653
INTERNAL COMBUSTION ENGINE OF
HIGH COMPRESSION TYPE
Filed Oct. 24, 1952  4 Sheets-Sheet 3

INVENTORS
FLOYD A. BLAKE
LIONEL D. THOMPSON
BY
Paul L. Keeler
ATTY.

Nov. 15, 1955

F. A. BLAKE ET AL 2,723,653

INTERNAL COMBUSTION ENGINE OF
HIGH COMPRESSION TYPE

Filed Oct. 24, 1952

INVENTORS
FLOYD A. BLAKE
LIONEL D. THOMPSON
BY
Paul L. Krohn
ATTY.

United States Patent Office 2,723,653
Patented Nov. 15, 1955

2,723,653

INTERNAL COMBUSTION ENGINE OF HIGH COMPRESSION TYPE

Floyd A. Blake, Stockton, Kans., and Lionel D. Thompson, Beloit, Wis., assignors to Fairbanks, Morse & Co., Chicago, Ill., a corporation of Illinois Application October 24, 1952, Serial No. 316,696

11 Claims. (Cl. 123—120)

This invention relates to improvements in internal combustion engines. More particularly, it has to do with an improved combustion control system for an engine of high compression character operating on a gaseous fuel.

A high compression engine provided for operation on a natural gas such as methane, propane or other similar gaseous fuel, with ignition of the cylinder charge produced by an igniting agency such as an electrical ignition spark discharge, is subject to the disadvantage that under relatively light engine loading up to about half the engine load capacity, ignition of the cylinder charge occurs if at all, only indifferently on a hit-or-miss basis. At such light loads, the proportionately reduced gas admission to the cylinder produces with the combustion air then obtaining in the cylinder, fuel mixtures having a heat energy level as maximum compression is approached, which while below that energy level tending to result in auto-ignition of the charge, is nevertheless so low that combustion ignition of the whole charge cannot be effected with required regularity, by an electrical spark discharge alone. One major reason for this is that in engine operation particularly below about half full load, the fuel-air ratio of the fuel mixture varies from a narrow, critical range within which spark ignition can take place, to such an extent that the energy level of the charge at the time of ignition is such that the additional heat energy of spark discharge is insufficient to cause ignition and combustion of the whole charge. What occurs in the cylinder is that the spark discharge produces ignition of the portion of the fuel charge in the immediate region of the spark plug terminals, but the resultant initial flame is almost instantaneously quenched by the surrounding lean mixture. This difficulty could be overcome in large part, by a very close control of both fuel and air to keep the fuel mixture within the critically narrow fuel-air ratio range necessary for successful ignition. However, accurate regulation and control of combustion air in delivery to the cylinder, is not only difficult of attainment, but would require complicated control provisions including air temperature regulation. The latter in particular, would be most necessary in view of normal and usually wide variations in temperature of the ambient air source from which the engine cylinder is supplied, as without temperature control, the weight of the cylinder fuel-air mixture would vary correspondingly with such temperature changes in the ambient air supply.

Accordingly, in meeting and overcoming the above expressed difficulty of ignition, it is most desirable and advantageous to provide a combustion ignition system which is effective without requiring close control of both fuel and air. Such a system is contemplated by the present invention, and is one which will assure positive and complete fuel charge ignition not only in the critical ignition range of engine operation, as from starting up to about one-half engine loads, but throughout engine operation at higher loads through full load.

It is, therefore, an important object of the present invention to provide an improved combustion-ignited system having an auxiliary source of heat energy which is coordinated in the engine cycle and effective in the critical low load range of the engine, to raise the energy level of the otherwise difficult to ignite lean fuel-air mixture in the cylinder to a point where general ignition and combustion of the mixture occurs.

A further object of this invention is the provision of a fuel control system for an engine whereby regular and complete ignition is obtained throughout the entire speed and load range from starting to full rating, without requirement of any special modulating regulation of the air supply to the engine.

A further object of this invention is the provision of an auxiliary combustion cell in which a readily spark ignitable mixture of a combustible charge is formed and spark ignited, the cell being so related to the engine cylinder combustion chamber that the flame resulting from combustion of the auxiliary charge, issues from the cell into the cylinder chamber and is of such effectiveness as to cause ignition and combustion of an otherwise difficult-to-ignite lean fuel-air mixture in the cylinder.

Another object of this invention is the provision of an auxiliary combustion chamber or cell, and means for forming in the cell a readily ignitable charge of such fuel-air ratio and energy level that its ignition will be consistently obtained throughout the entire speed and load range of the engine, by the expenditure of a small quantity of triggering energy, such as a spark.

A further object of this invention is the provision of an auxiliary combustion cell connected with a separate automatic cell fuel supply system, and related to the main cylinder such that a charge of concentrated fuel in the cell will be diluted by a portion of the cylinder fuel-air mixture received in the cell during the compression stroke, with dilution to a point where the resultant mixture in the cell is readily ignitable with relatively small triggering ignition energy such as a spark.

According to the general features of the present invention and in one embodiment thereof, an auxiliary combustion chamber or cell is arranged in the cylinder head of a two cycle high compression gas engine, in communication with the main cylinder through a restricted opening. Gas under pressure is directed to the cell from a gas header through a passage that is controlled by a check valve operated by the differential in pressures on opposite sides of the valve. During the entire period when the exhaust port is open or the cylinder pressure is low, the check valve is in an open position permitting flow of gas to the cell. When the pressure in the cylinder rises to the pressure level of the gas in the header, as at a time relatively early in the compression stroke, the check valve closes and gas flow to the cell stops.

The restricted orifice connecting the auxiliary cell to the main cylinder, permits a correspondingly limited portion of the lean fuel-air mixture present in the cylinder, to pass into the cell and mix with the gas that was admitted therein during the low pressure part of the compression cycle. This orifice is so proportioned in relation to the volume of the cell, the volume of the main cylinder, and the compression pressure in the cylinder, as to determine the quantity admission of cylinder charge to the cell in the compression cycle in amounts sufficient to effect by dilution of the original cell mixture, a resultant cell mixture within range of fuel-air ratios facilitating ready and consistent ignition of the mixture by a relatively low energy triggering system, as an electric spark system.

Other and further objects, features and advantages of the present invention will be apparent to one skilled in the art from the following detailed description taken in connection with the attached sheets of drawings.

On the drawings:

Fig. 3 is an enlarged view of a valve device associated with the cell of Fig. 2.

Fig. 4 is a horizontal sectional view taken on line 4—4 of Fig. 3.

Fig. 5 is a horizontal sectional view taken on line 5—5 of Fig. 3.

Fig. 6 is a fragmentary vertical section taken centrally through a typical engine cylinder, and indicating more or less diagrammatically, the fuel supply lines of the novel combustion system of the present invention.

As shown on the drawing:

Figure 1:
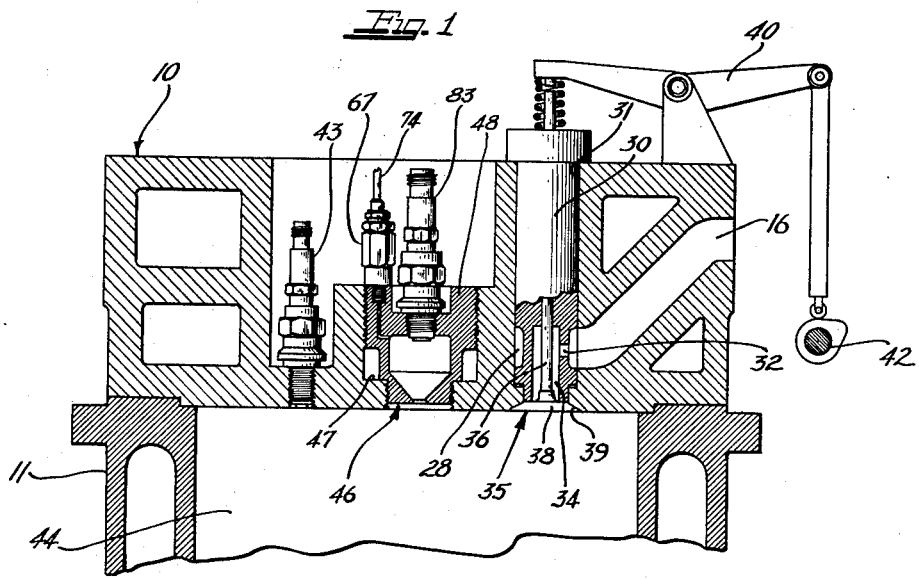
Fig. 1 is a fragmentary vertical sectional view taken centrally through an engine cylinder and cylinder head provided with an auxiliary combustion cell constructed according to the teaching of the present invention.

In Figs. 1 and 6 the reference numeral 10 indicates generally a cylinder head mounted on a cylinder 11 of a two cycle, high compression gas engine. The cylinder having the piston 12 therein, is provided with piston-controlled air port means 14 and exhaust port means 15 (Fig. 6). Gaseous fuel is delivered to the cylinder through a passage 16 formed in the cylinder head and communicating at one end, with a gas header 18, Fig. 6. Gas from a supply main 19, is directed to the header 18 through a conduit 20 which is provided with a gas meter 22, safety control 23, and a pressure regulator 24. Regulator 24 determines the gas pressure in the line 20 leading to the header 18, such that it is at a desired value for a given engine installation of the system, as for example, about 40 pounds per square inch in an actual embodiment of the engine shown. A governor throttle valve 26 operated by a suitable engine speed responsive governor 27, is disposed in the conduit 20 relatively adjacent the engine.

At its other end, the passage 16 communicates with an annular recess 28 (Fig. 1) formed in the external surface of a generally cylindrical valve body 30 disposed in an opening 31 in the cylinder head. A passage 32 permits gas in the recess 28 to flow to a chamber 34 in the interior of the valve body. A main gas admission valve 35 has a stem 36 guided for reciprocating movement in the valve body 30, and a valve head 37 with a frusto-conical face adapted to close against the valve seat 39. The main gas admission valve 35 may be moved to open position for gas delivery into the main cylinder in timed relation in the engine cycle, as effected by any suitable engine-operated valve operating means such as the rocker 40 actuated from the engine cam shaft 42. The valve may be returned to closed position by the usual spring mechanism (not shown) acting on valve stem 36. A spark plug 43 is disposed in the cylinder head 10 with its electrode exposed in the main combustion chamber 44.

An auxiliary combustion cell assembly 46 is mounted in a stepped opening 47 (Figs. 1 and 2) in the cylinder head. This assembly comprises a body member or adapter 48, Fig. 2, having a large diameter threaded portion 50 engaged in an internally threaded portion 51 of the opening 47. A reduced diameter threaded portion 52 of the body member 48, is engaged in a threaded portion 54 of the opening 47. The body member 48 has an internal space or chamber 55 defining a combustion cell. The cell has an upper cylindrical section 56 and a lower cylindrical section 58 connected by a frusto-conical transition section 59. The lower section 58 constitutes a restricted orifice through which the cell 55 communicates with the main combustion chamber 44. An annular chamber 60 is formed around the cell body 48 by a recess 62 in the outer surface of the body member 48 which cooperates with the wall of the opening 47 to define the jacket chamber 60 through which cooling fluid may be circulated by any suitable means (not shown). The amount of cooling fluid circulated through the chamber 60 must be such as to effect cell cooling sufficiently to prevent auto-ignition of the relatively rich fuel mixture formed in the cell.

Gas is delivered to the cell 55 through a passage 63 in the body member 48, which passage is in alignment with a passage 64 in an adapter 66 forming part of a differential pressure-operated gas control valve 67, the adapter being threaded into an opening 68 in the body member. The passage 64 communicates with a passage 70 in a fuel inlet fitting 71, by means of a valve chamber 72. A fuel supply line 74, Fig. 6, connects the fitting 71 to the supply conduit 20 on the downstream side of the pressure regulator 24, and contains a separate gas pressure regulator 75 for further reducing the gas pressure determined by the regulator 24, to a desired lower value, as for example, to about 7 pounds per square inch in delivery to the differential valve 67. If the line 74 is connected on the upstream side of the pressure regulator, as shown in dotted lines, a separate pressure regulator 75' must be used to reduce the gas pressure of main 19 to the desired 7 pound pressure at valve 67. As best seen in Figs. 3, 4, and 5, the valve chamber 72 is of generally figure eight form in plan, providing circular pockets 76, and this chamber is open to a cylindrical chamber 78 thereabove in which a valve disk 79 is disposed. The disk 79 which has a thickness approximately half the depth of chamber 78, has a central solid portion 80 of greater area than the cross-sectional area of the passage 70 which it underlies, and three equi-spaced, radially-extending arms 82 that extend to the wall of the chamber 78. Arms 82 of the disc valve confine the latter against lateral displacement, and are dimensioned such that in any angular position of the valve in the plane of recess 78, at least one of the pockets 76 and the recess 78 will be in communication. When the gas pressure in the inlet passage 70 is greater than the pressure in the passage 64 which leads to the cell, the valve disc 79 is forced into its lowermost position, uncovering passage 70 and permitting gas to flow through the chamber 72 to the passage 64. When the pressure in the passage 64 exceeds the pressure in the passage 70, as when the compression pressure in the main cylinder exceeds the pressure in the gas supply header, the valve disc will be moved into its uppermost position covering the opening 70, and hence cutting-off further gas admission. A spark plug 83, Fig. 2, which may be of standard construction, is threaded into an opening 84 in the body member 48, with the electrodes 86 of the spark plug exposed in the cell 55.

With the now described ignition provision in application to an engine of high compression, two-cycle type as indicated, and considering the engine in operation within its critical ignition range hereinbefore referred to as present under relatively low and medium engine loading, it will appear that as the engine cylinder pressure falls to a low value in the exhaust cycle, the pressure in the cell 55 and reflected in the valve chamber 72 will be below the gas pressure (7 pounds for example) in line 74 acting on the valve disc 79. The valve disc then responds to an open position, permitting gas to enter the cell. Gas flow into the cell continues until a time early in the engine compression cycle when the pressure of the cylinder gas-air charge is such as to impose through the cell port 58, pressure on the gas and air in the cell to compress the latter to a pressure sufficiently greater than the gas pressure in line 74 acting against valve disc 79, as to cause valve closure. Thereafter and as cylinder compression continues toward the end of the compression cycle, some of the then lean gas-air charge in the cylinder will pass into the cell through the restricted cell port 58, and dilute the comparatively rich gas-air charge in the cell. For a given engine, the volume of the cell and the size of the cell port opening 58 are predetermined such that during the compression cycle in the operation of the engine especially at low loads as well as at starting, the quantity of cylinder fuel charge entering the cell and mixing with the cell charge, will be restricted thereby to such quantity as will produce with the cell charge, a gas-air mixture within a range of gas-air mixtures readiy ignitable by a low energy ignition triggering device, as a spark discharge. Proper cooling of the cell 55 as by flow of cooling fluid in the cell jacket space 60, is maintained throughout engine operation in order to reduce residual heat concentration in the cell which otherwise would tend to cause auto-ignition of the cell charge.

At the desired predetermined time near the end of the compression cycle, the cell spark plug 83 is energized as by a suitable, engine timed ignition system, not shown except for the plug 83, to produce a spark discharge at the plug terminal 86 in the cell. The cell charge thus ignited, undergoes initial combustion in the cell until the combustion pressure in the cell rises to a high value (occurring almost instantaneously), resulting in flame propagation through the cell port 58 into the compressed cylinder charge. Since the fuel igniting energy level of the flame issuing from the cell, is very much greater than that of the spark from an ignition spark plug, the otherwise difficult-to-ignite lean mixture in the engine cylinder is thereby effectively ignited in each ignition period, thus eliminating misfiring otherwise prevalent especially at low loads, in the absence of special provisions for air modulation to richen the cylinder fuel-air mixture.

For a given engine cylinder assembly having a cylinder bore of determined size and a compression ratio of fixed value within the compression ratio range normally associated with high compression engines of diesel type, and given the nature and characteristics of the gaseous fuel to be employed, the volume of the ignition cell 55, the size of its port 58 and the degree of cell cooling through the jacket provision 60, are selected and determined by empirical process of selection, to facilitate formation of a cell charge characterized by ready ignitability in response to a low heat energy addition to the charge, as an electrical spark of low intensity. The size of the cell port 58 is thus selected such that it not only restricts the cell inflow of gas-air mixture from the cylinder combustion space, to the necessary degree for dilution control of the cell charge, but retards and substantially prevents the creation from the swirling, turbulent condition of the fuel-air mixture in the engine cylinder during the compression cycle, of a like turbulence of the cell charge. Consequently, the cell charge throughout its formation, remains in a relatively non-turbulent or quiescent state, which is conducive to the attainment of the character of cell charge here desired. Considering the cell volume, the size of the cell port 58 and the degree of cell cooling, these are determined and correlated as noted above, so that the resultant cell provision is effective under all load and speed conditions of the given engine, to determine and present at the desired time-point of ignition in the engine cycle of operation, a cell charge characterized by a fuel-air ratio within a readily ignitable range (for the given gaseous fuel), and a heat energy level (resulting from cell charge compression in the engine compression cycle), such that the charge is then very close to its auto-ignition point. The ignition charge thus and by reason of the determined small volume of the cell 55, is a highly concentrated body of fuel and air in intimate mixture and at an energy level close to auto-ignition. Therefore, it is only necessary to expose this charge to an ignition triggering heat energy medium affording but a very small heat energy boost, in order to cause positive ignition and combustion of the cell charge. Advantageously, the triggering medium may be a relatively low intensity electrical spark, as herein indicated.

The present ignition system thus is particularly effective in affording positive and regular ignition in a high compression gas engine operating over the critical range of ignition, as at starting and at low and intermediate loads below about one-half the engine load capacity, and is adapted for assuring equally effective and consistent ignition in engine operation at higher loads up to full loading. It is important to note that the system functions without any requirement of control expediencies for regulating the combustion air supply to improve the cylinder fuel-air ratios such as to result in fuel mixtures more readily ignitable throughout the engine load and speed range. While in an engine embodying the instant ignition provision, the combustion air supply to the cylinder may be delivered directly from the atmosphere through the cylinder air ports, it is preferable for increased engine efficiency and greater horsepower output, to supply air under a predetermined low positive pressure, as may be effected by a suitable air blower (not shown) either separately driven or driven from the associated engine. With regard to the cylinder spark plug 43, this plug may be in timed spark-discharge operation throughout engine operation over its load and speed range, but its effectiveness in assisting the cell ignition provision to assure positive and consistent fuel ignition, appears to any appreciable degree only in high load operation of the engine, as in the range of full loading.

Figure 8:
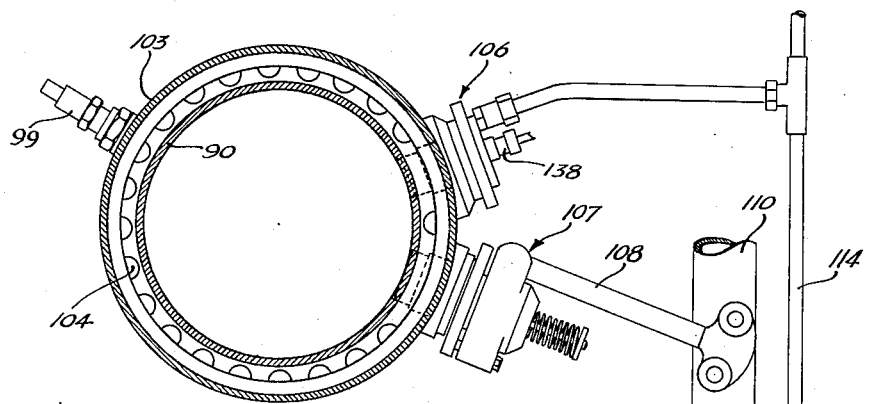
Fig. 8 is a horizontal sectional view taken on line 8—8 of Fig. 7 illustrating the general arrangement of the fuel supply lines.
Figure 7:
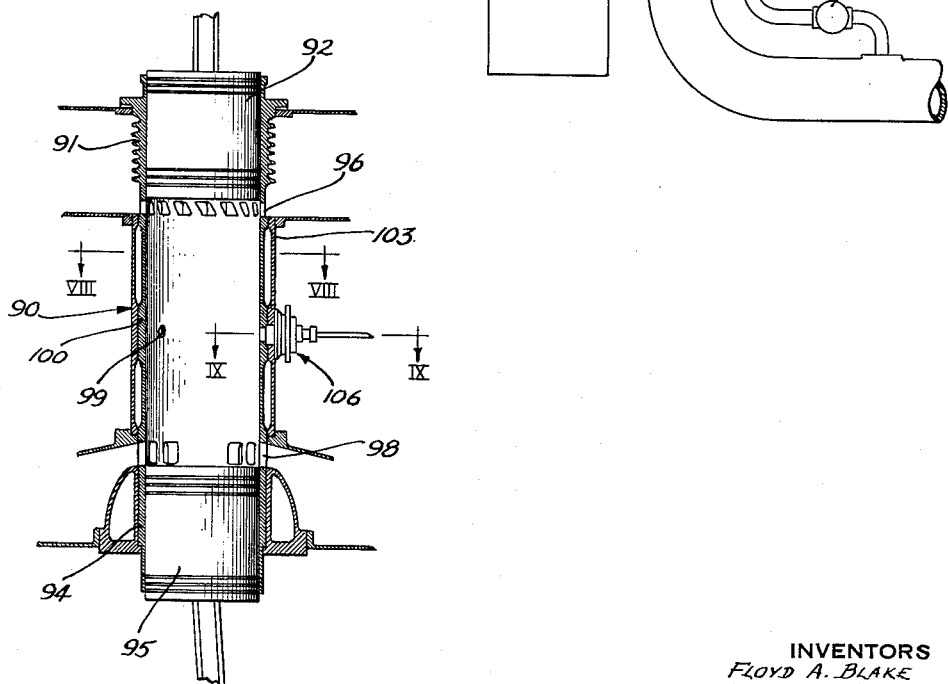
Fig. 7 is a vertical sectional view taken centrally through a typical opposed piston engine to which the combustion system of the present invention is applied.
Figure 9:
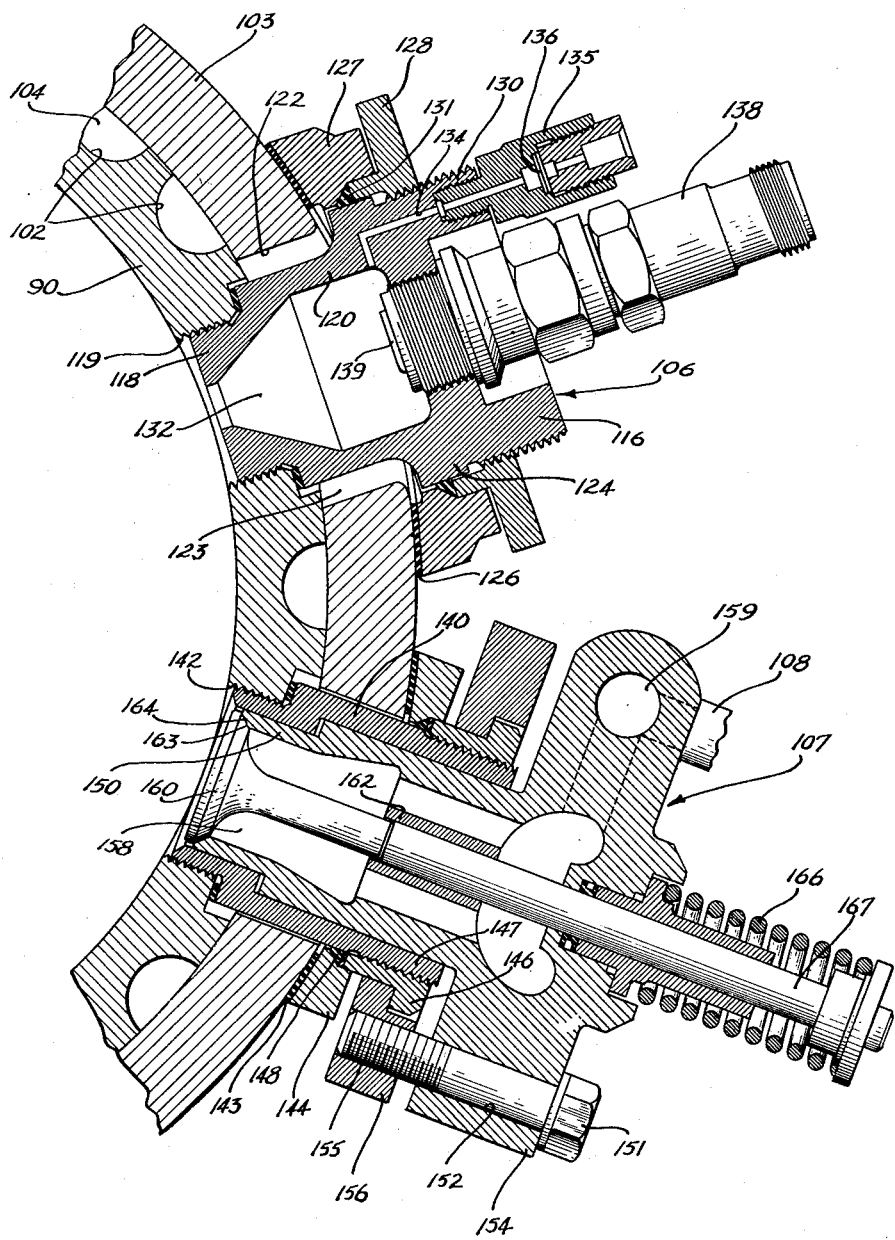
Fig. 9 is a sectional view taken on line 9—9 of Fig. 7.

In Figs. 7, 8, and 9 the novel fuel combustion system of the present invention is illustrated in application to an opposed piston engine of two-cycle, high compression type. The reference numeral 90 indicates a cylinder liner which has an upper cylinder portion 91 in which a piston 92 is slidably disposed, and a lower cylinder portion 94 in which a piston 95 is mounted for reciprocating movement. Scavenging air ports 96 and exhaust air ports 98 are provided in the cylinder liner. A spark plug 99 may be located in the cylinder liner such as to lie in the main combustion zone defined between the heads of the opposed pistons as they approach their innermost positions. This plug serves the same purpose indicated for the plug 43, as expressed hereinbefore.

The liner 90 has a longitudinally central portion 100 in the outer surface of which longitudinal recesses 102, Fig. 9, are formed. These recesses coact with the inner central wall surface of an outer sleeve 103, disposed tightly over the central portion 100, to define cooling passages 104.

An auxiliary combustion cell assembly 106 and a gas valve assembly 107 are mounted in the cylinder liner substantially midway between its ends. Gaseous fuel is supplied to the main gas valve assembly 107 through a branch conduit 108, Fig. 8, which communicates with a gas header 110 having a governor controlled throttle valve 111 connected to an engine speed responsive governor indicated at 112. The auxiliary combustion cell assembly communicates with the gas header 110 through a branch conduit 114. A pressure regulator 115 may be disposed in the branch conduit 114.

As best seen in Fig. 9, the auxiliary combustion cell assembly 106 includes a body member or adapter 116 having an exteriorly threaded portion 118 screwed into a tapped opening 119 in the wall of the central portion 100 of the cylinder liner. The adapter 116 has a central portion 120 extending loosely through an opening 122 in the wall of the sleeve 103 to define a cooling chamber 123, and an enlarged diameter outer end portion 124 that overlaps the opening 122. A seal ring 126, disposed under an annular clamping ring 127, is pressed into liquid sealing engagement with the outer wall 103 of the cylinder by a nut 128 which engages an exteriorly threaded end 130 of the adapter end portion 124. The nut 128 exerts pressure on the ring 127 through a seal ring 131 which also engages the wall of the adapter 106.

The adapter 116 has a hollow interior defining an auxiliary combustion cell 132 to which gaseous fuel is delivered through a passage 134 in the adapter body and a fitting 135. An automatically operable check valve 136 controls flow of gas to the cell 132. A spark plug 138 is threaded into the adapter 116 and has its electrode 139 extending into the cell. The cell 132 and valve 136 may, and, preferably do, correspond in general structure and function to the cell and valve of Figs. 1 to 3.

Gaseous fuel is delivered to the main combustion space of the cylinder 90 through a gas valve assembly 107 which includes a hollow, generally cylindrical adapter 140 threaded into an opening 142 in the central portion 100 of the cylinder liner. A seal ring 143, disposed under an annular clamping ring 144, is pressed into fluid-tight engagement with the outer wall of the cylinder by an annular nut 146 which engages an exteriorly threaded end 147 of the adapter. The nut 146 exerts pressure on the ring 143 through a seal ring 148 which also sealingly engages the outer surface of the adapter 140. A valve housing 150 fits snugly inside the adapter, being positioned therein by the engagement of mating stepped surfaces. The housing 150 is secured on the adapter by a plurality of capscrews 151, one only being illustrated. Each capscrew passes freely through an opening 152 in a flange 154 of the valve housing 150, with the end of the capscrew engaged in a tapped opening 155 in a collar 156 disposed around the nut 146.

The valve housing 150 has a hollow interior providing a passage 158 receiving gaseous fuel from the branch conduit 108 through valve casing passage 159. A poppet valve 160 is slidably journalled in a spider formation 162 which extends across the interior of the valve housing. The valve has a frusto-conical seating surface 163 which is urged into engagement with a valve seat 164 by a spring 166 and is moved away from the valve seat by any suitable engine timed valve actuating mechanism (not shown) acting on the valve stem 167.

Figure 2:
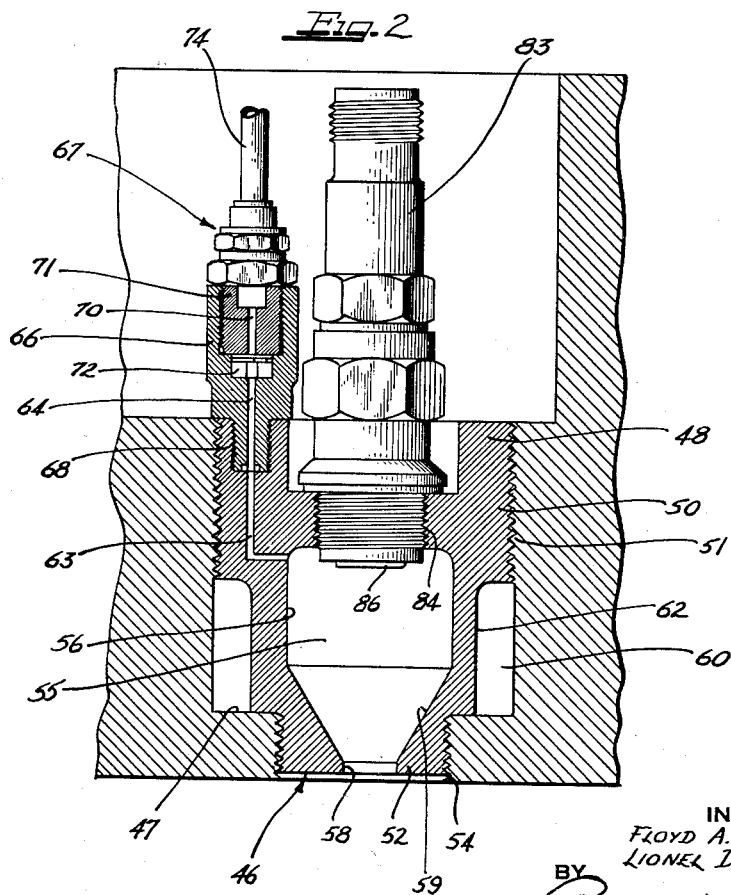
Fig. 2 is an enlarged view of the auxiliary combustion cell of Fig. 1.

The opposed piston engine ignition arrangement illustrated in Figs. 7, 8, and 9, will function exactly as explained in connection with the cell arrangement of Figs. 1 and 2, that is, a charge made up of a readily spark ignited fuel-air mixture formed in the auxiliary cell 132 and the combustion of this charge sets off the main charge in the main cylinder.

From the foregoing description it will be seen that there is provided by this invention, a novel means of initiating the combustion of a lean fuel-air mixture in an engine. The novel auxiliary combustion cell and its particular arrangement in the engine permits positive, regular ignition of the charge throughout the entire speed and load range, from starting to full rating, without requiring any instrumentality control of the air supply. With this improved arrangement, the ignition flame from the auxiliary combustion space will ignite even very lean fuel-air mixtures in the engine cylinder. Further and as now fully described, throughout engine operation from starting up to and beyond full load, the fuel-air mixtures formed in the auxiliary chamber are all within a range of fuel-air mixtures capable of easy spark ignition.

It will be understood that modifications and variations may be effected without departing from the scope of the novel concepts of the present invention.

What is claimed is:

1. In an internal combustion engine, a cylinder and piston assembly forming a cylinder combustion space and including means for cylinder admission of combustion air, gaseous fuel supply means, means for delivering gaseous fuel from said supply means to the cylinder combustion space, means forming a combustion chamber auxiliary to the cylinder combustion space and in open communication with the latter, means for delivering gaseous fuel from said supply means to said combustion chamber at a predetermined delivery pressure, the last said means including a delivery control valve operable responsively to the differential between the pressure in said chamber and said pre-determined gaseous fuel delivery pressure, the gaseous fuel in the chamber forming with gaseous fuel and air entering the chamber from the cylinder combustion space, a readily ignitable fuel mixture, and means effective in said chamber for timed ignition of the fuel mixture therein.

2. In combination in an internal combustion engine having a cylinder in which a combustible fuel is burned, means providing a supply of gaseous fuel, passage means communicating said supply means with said cylinder, an auxiliary combustion chamber, means defining a restricted orifice between said chamber and said cylinder, a conduit between said gaseous fuel supply means and said auxiliary chamber, a valve in said conduit sensitive to the differential between the fuel pressure in the conduit and the pressure in said auxiliary chamber, and means including a valve in said passage for delivering a charge of gaseous fuel from said supply means directly into said cylinder.

3. In combination in a two cycle internal combustion engine having a main combustion cylinder, means providing a supply of gaseous fuel under pressure, means defining a passage communicating said supply means with said cylinder, a valve controlling flow of gaseous fuel through said passage, an auxiliary combustion chamber, means defining a restricted orifice between said auxiliary chamber and said cylinder, a conduit connecting said supply means to said auxiliary chamber, and a valve in said conduit sensitive to the differential between the fuel pressure in the conduit and the pressure in said auxiliary chamber.

4. In an internal combustion engine, a main combustion space, an auxiliary combustion space, a restricted orifice communicating said spaces, means for delivering a substantially constant quantity of air to said main combustion space during each air intake cycle of the engine, separate means for delivering gaseous fuel to said main and auxiliary combustion spaces for mixture with air therein, a portion of the fuel-air mixture in the main combustion space being delivered through said orifice to the auxiliary combustion space in each compression cycle of the engine, for mixture with the gaseous fuel separately delivered to the latter space, and the volume of said auxiliary space and the size of said orifice being predetermined such that the resultant fuel-air mixture obtaining in the auxiliary combustion space at the end of the compression cycle, is within a fuel-air ratio range in which the mixture is readily ignitable, and ignition means in the auxiliary combustion space.

5. In an internal combustion engine, a cylinder and piston assembly providing a combustion chamber, means providing a source of gaseous fuel, admission means including an engine-timed control valve for admitting gaseous fuel from said source to the cylinder combustion chamber, means providing a combustion space auxiliary to the cylinder combustion chamber and having restricted communication with the chamber, means for conducting gaseous fuel from said source to said combustion space at a pre-determined delivery pressure, the last said means including a control valve sensitive to the differential between the pressure in said auxiliary combustion space and said pre-determined gaseous fuel delivery pressure, and a fuel igniting means exposed in the combustion space.

6. In an internal combustion engine, a cylinder and piston assembly providing a combustion chamber, means providing a source of gaseous fuel, admission means including an engine-timed control valve for admitting gaseous fuel from said source to the cylinder combustion space, means providing a combustion space auxiliary to the cylinder combustion chamber and having restricted communication with the chamber, means for conducting gaseous fuel from said source to said combustion space, a fuel igniting means in the auxiliary combustion space, and a fuel igniting means in said combustion chamber.

7. In an internal combustion engine, a cylinder and piston assembly providing a combustion chamber, the cylinder having piston-controlled air admission and exhaust ports, means providing a source of gaseous fuel under pressure, fuel admission means providing engine-timed admission of gaseous fuel from said source to the cylinder combustion chamber, means providing a combustion space auxiliary to said combustion chamber and having restricted communication with the chamber, conduit means between said gaseous fuel source and said combustion space for gaseous fuel delivery to the latter, said conduit means including a control valve operable in response to the differentials of pressure between the gaseous fuel pressure in the portion of the conduit means between the valve and the gaseous fuel source and the pressure in the auxiliary combustion space, and a fuel igniting means in the auxiliary combustion space.

8. In a two-cycle, high compression internal combustion engine, a cylinder and piston assembly providing a cylinder combustion space and having piston-controlled air intake and exhaust port means, means providing a source of gaseous fuel under pressure, means including a pressure regulator, for effecting engine-timed admission of gaseous fuel from said source to the cylinder combustion space at a predetermined fuel pressure determined by said pressure regulator, the gaseous fuel so admitted to the combustion space combining with air in the space admitted thereto through the air intake port means, to form a fuel-air mixture, means forming an auxiliary combustion chamber adjacent the cylinder combustion space and providing a restricted opening communicating the chamber with the cylinder combustion space, means for delivering to said auxiliary combustion chamber, gaseous fuel from said source and at a pressure below said predetermined pressure of the gaseous fuel admitted to the cylinder combustion space, a portion of the fuel mixture in the cylinder combustion space entering said chamber through said restricted opening during the compression cycle of the engine, and mixing with the gaseous fuel therein to form a fuel mixture characterized by ready electric spark ignitability, and an electric spark discharge device in said auxiliary combustion chamber.

9. In a two-cycle, high compression internal combustion engine, a cylinder and piston assembly forming a cylinder combustion space and providing piston-controlled air intake and exhaust port means, means providing a source of gaseous fuel under pressure, a supply connection between said source and the cylinder combustion space, said connection including an engine operated control valve for engine-timed admission of gaseous fuel to the cylinder combustion space, the gaseous fuel when admitted to the cylinder combustion space combining with air delivered through the said air intake port means, to form a fuel-air mixture, means forming an auxiliary combustion chamber adjacent the cylinder combustion space and providing a restricted opening communicating the chamber with said combustion space, a conduit connection between said gaseous fuel source and said auxiliary combustion chamber, said connection including a pressure regulator for establishing the pressure of the gaseous fuel supplied to the combustion chamber at a predetermined pressure below the pressure of the source, the connection further including a differential-pressure responsive control valve operable to permit gaseous fuel admission to the combustion chamber only when the chamber pressure is less than said predetermined pressure of the gaseous fuel in supply to the chamber, a portion of the fuel mixture in the cylinder combustion space entering said chamber through said restricted opening during the compression cycle of the engine, and mixing with the gaseous fuel in the chamber to form a fuel mixture characterized by ready electric spark ignitability, and an electric spark discharge device in said auxiliary combustion chamber.

10. The method of operating a two-cycle internal combustion engine providing a cylinder combustion space and an auxiliary combustion space in restricted communication with the cylinder space, which comprises admitting constant charges of air to the combustion spaces, supplying to the cylinder combustion space controlled charges of gaseous fuel varied in amount directly in accordance with variations in engine loading, separately supplying gaseous fuel under constant supply pressure to the auxiliary combustion space, terminating the supply of gaseous fuel to the auxiliary combustion space when the pressure of the fuel-air mixture in said auxiliary space exceeds the constant supply pressure of the gaseous fuel in supply to the auxiliary space, compressing the fuel-air mixture in the cylinder combustion space, coincidentally compressing the fuel-air mixture in the auxiliary combustion space to provide therein at the time of ignition in the engine compression cycle, a compressed fuel-air mixture characterized by ready ignitability irrespective of the composition of the fuel-air mixture in the cylinder combustion space, and igniting the compressed fuel-air mixture in the cylinder combustion space.

11. The method of operating a two-cycle internal combustion engine providing a cylinder combustion chamber and an auxiliary combustion space in restricted communication with the cylinder chamber, which comprises admitting constant charges of air to the combustion chamber and space, supplying to the cylinder combustion chamber gaseous fuel under a constant supply pressure and in controlled charges varied in amount in direct accordance with variations in engine loading, separately supplying to the auxiliary combustion space gaseous fuel under a constant supply pressure less than the supply pressure of the gaseous fuel supplied to the cylinder combustion chamber, terminating the supply of gaseous fuel to the auxiliary combustion space in the engine compression cycle when the pressure of the fuel-air mixture in the auxiliary combustion space exceeds the constant supply pressure of the gaseous fuel in supply to the auxiliary space, compressing the fuel-air mixture in the cylinder chamber and coincidentally compressing the fuel-air mixture in the auxiliary combustion space to provide in said space at the time of ignition, a compressed fuel-air mixture characterized by ready ignitability irrespective of the composition of the compressed fuel-air mixture in the cylinder chamber, and igniting the compressed fuel-air mixture in the auxiliary space to produce ignition of the compressed fuel-air mixture in the cylinder chamber.

References Cited in the file of this patent

UNITED STATES PATENTS

| | | |
|---|---|---|
| 2,156,665 | Mallory | May 2, 1939 |
| 2,562,511 | Schowalter | July 31, 1951 |
| 2,615,437 | Broderson | Oct. 28, 1952 |